June 14, 1932.  C. M. WESTCOTT  1,862,732

SEEDER

Filed Sept. 17, 1928

INVENTOR.
Clyde M. Westcott
BY
ATTORNEYS.

Patented June 14, 1932

1,862,732

UNITED STATES PATENT OFFICE

CLYDE M. WESTCOTT, OF LOS ANGELES, CALIFORNIA

SEEDER

Application filed September 17, 1928. Serial No. 306,346.

My invention relates to seeders, and more particularly to a machine for removing the seeds from dates, olives and the like, by cutting the article in such a way that the seed is discharged in one place and the meat thereof is discharged in another place.

Among the salient objects of my invention are: to provide in a machine of the character referred to means for directing the date, olive or other article through a conduit with cutting means intersecting such conduit and adapted to cut said article from opposite sides and to continue the seed on through the conduit while the meat thereof is shunted to the side and is carried away for use; to provide in such a machine means yieldingly mounting the cutting means whereby the machine automatically adjusts to the various sizes of dates or other articles being passed therethrough; to provide in a machine of the character referred to revolving cutters, one of which is provided with teeth to engage with and move the seed on through the conduit, while the meat is cut therefrom and carried away to another place of discharge; and, in general, to provide a simple, practical and efficient mechanism for removing the seed from dates and the like, and for also removing the meat therefrom in the same operation.

In order to fully explain my invention, I have shown one practical form thereof on the accompanying sheet of drawing, which I will now describe.

Figure 1:
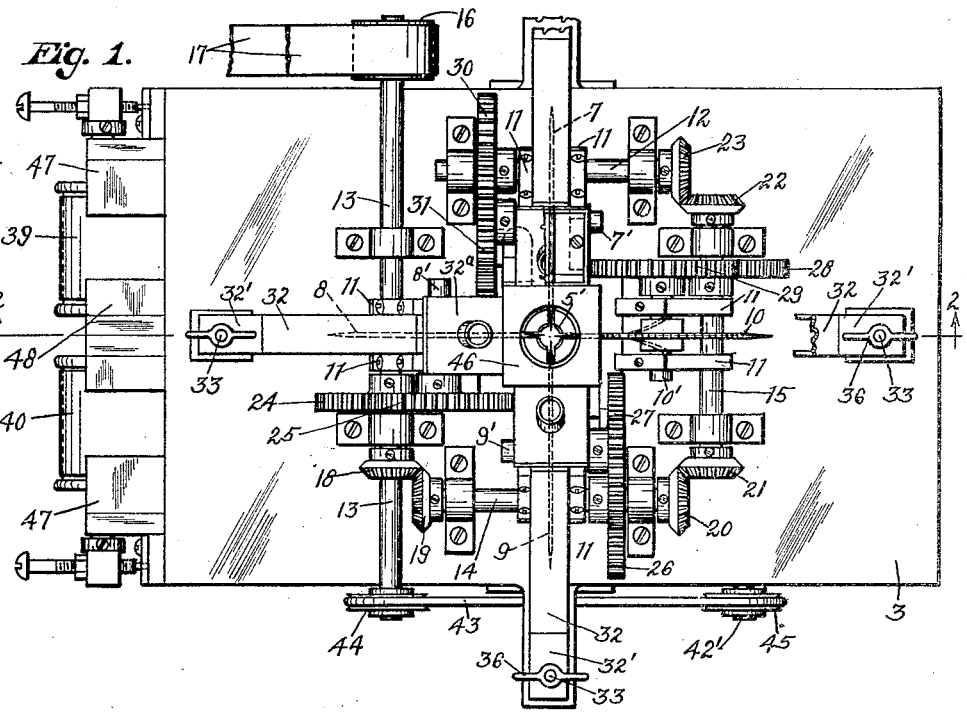
Figure 1 is a top plan view of a machine embodying my invention.

Referring now in detail to the drawing, my invention as here embodied for illustrative and descriptive purposes includes a base 3, with an opening 4, therethrough, in which opening is supported a tubular member 5, with a conical upper end, 5', slitted in quarters, as at 5ª. Said tubular member 5 is frictionally supported through said opening 4, by means of a collar 6, with wings 6' from its opposite sides secured in the base 3.

Mounted on said base 3, are four cutting elements, here represented as round cutter blades, designated 7, 8 and 9, and one cutter saw 10, said cutting elements being mounted to approach each other through the slitted upper conical end of the tubular member 5, as will be clear from the drawing. Said cutting elements are mounted, respectively, on short shafts 7', 8', 9' and 10', between spaced upstanding members, as 11, 11, pivotally mounted at their lower ends on driving shafts, 12, 13, 14 and 15. Shaft 13 is shown provided with a pulley 16, driven from any suitable motive power by belt 17, although any power means can be used. With intermeshing beveled gears 18 and 19, shaft 14 is driven from shaft 13. With intermeshing gears 20 and 21, shaft 15 is driven from shaft 14. With intermeshing gears 22 and 23, shaft 12 is driven from shaft 15. Shaft 13 is also provided with large gear 24, in mesh with gear 25, on short shaft 8', for driving cutter 8. Shaft 14 is provided with large gear 26, in mesh with gear 27, on shaft 9', for driving cutter 9. Shaft 15 is provided with large gear 28, in mesh with gear 29, on shaft 10', for driving cutter 10. Shaft 12 is provided with large gear 30, in mesh with gear 31, on shaft 7', for driving cutter 7. Thus it will be seen that all of said cutting elements 7, 8, 9 and 10, are driven in the same direction from the one shaft 13, with the connections enumerated.

Mounted on the outer sides of the upstanding members 11, 11, are shields or protector means, as 32, fitting over each cutting element, each of said protector means is provided with an extension, as 32', placed over an upstanding screw 33, with coiled springs 34 and 35 under and over said extension, 32', with adjustment nuts, 36 and 37, for adjusting said shields and also holding the cutting members in different positions to and from the conical member 5. Said cutter elements and their shields are mounted on the spaced upstanding members 11, 11, and all move yieldingly to and from the center. The upper ends of said shields 32, are provided with a box or lubricant container, as 32ª, in which is placed some suitable lubricant, such as an inert mineral oil, or paraffine oil. This is for lubricating the cutters, and keeping them in good condition. Scrapers, as 38, are mounted on the upstanding members 11, on their lower inner edges, and these scrapers bear against the opposite sides of the cutters to keep them clean.

Mounted on the underside of the base 3, are two traveling, endless conveyors, 39, 40, on rollers, as 41, 42, driven by a belt 43, running over a pulley 44, on the end of shaft 13, and over a pulley 45, on the shaft 42' which carries rollers 42.

Figure 2:
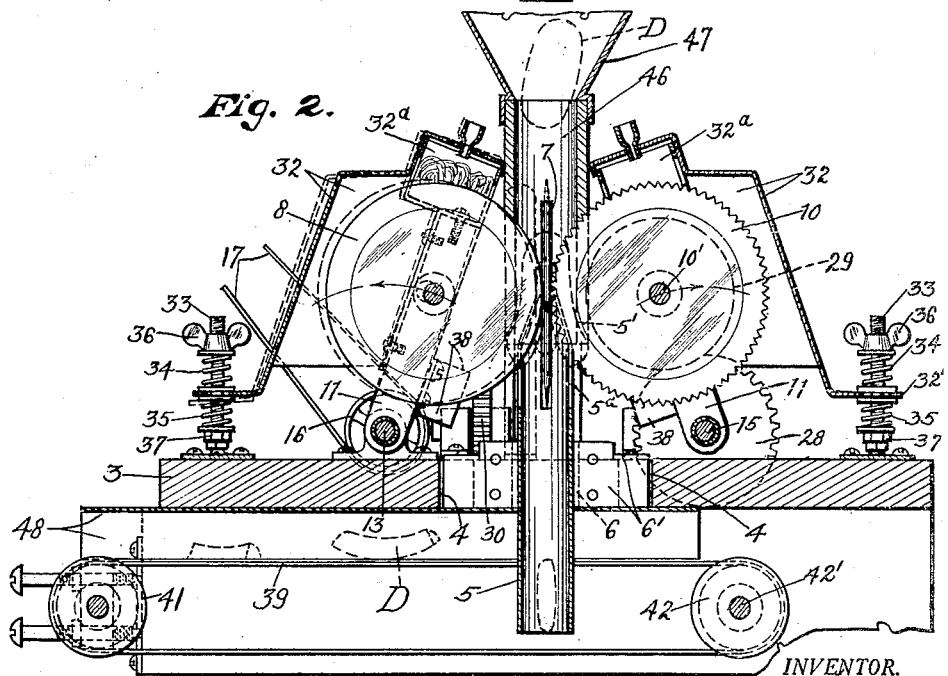
Figure 2 is a vertical sectional view thereof taken on line 2—2 of Fig. 1.

As means for feeding dates, olives or other articles to the cutting elements and the upper conical end of the tubular member 5, a square block is shown, designated 46, with its four sides slitted at the lower end of said block so that it will slip down over the cutting elements, in the center of the device, and with the tubular member 5, form a conduit down through the center of the machine, as indicated in Fig. 2. A hopper 47 is shown in the upper end of said block 46, for feeding the articles down to the cutting elements. A date is shown in light broken lines, designated D, in the hopper, ready to be fed down through the conduit to the meeting cutting elements. The teeth on the cutting element 10, serve to force the article down through the machine, the seed being carried down through the conical upper end of the tubular member 5, the points or edges of the four segments of said upper conical end serving to shunt the meat of the date to the outside of said tubular member 5, allowing it to drop down through the central opening 4, in the base, and on to the conveyors, as indicated in Fig. 2. The cutting elements, as shown, cut the date into four pieces, or quarters, the seed being carried down through the conical upper end of the tubular member 5, and the meat being peeled from the seed as it is forced down over the pointed upper end of said member 5.

Thus as the dates are fed one by one down through the block 46, they are caught by the cutting elements and cut into quarters, the saw or toothed cutting element 10 serving to force the seed down through the open conical end of the member 5, while the meat is peeled in quarters and dropped on to the conveyors 39 or 40. Side guard members, as 47 and 48 are placed over the opposite edges of the conveyors 39 and 40, to guide the cut meats on to said conveyors.

I am aware that many changes can be made in the details of my invention as here shown and described for illustrative purposes without departing from the spirit thereof, and I do not limit the invention to the details shown, except as I may be limited by the hereto appended claims.

I claim:

1. A seeder for removing the seeds from fruit including a vertical tubular member through which the article is fed, radially disposed cutters operating through slots in the sides of said tubular member, means for driving said cutters together, an inner tubular member telescoping up into said first tubular member and having a conical upper end slitted to receive said cutters, said conical upper end being open to receive the seed and adapted to peel the meat from the fruit as it is forced down by said cutters between the inside of the outer member and outside of said inner tubular member.

2. A seeder for removing the seeds from fruit and the like including a plurality of revolving cutter blades radially mounted with means for driving them with their edges converging toward each other, a tubular member slitted through its sides to fit down over said converging cutter blades to guide articles thereto, an inner tubular member having a conical upper end slitted to fit over said cutter blades within said first tubular member and being smaller in diameter, the upper end of said inner tubular member being open to receive the seed and adapted to peel the meat from said fruit as it is forced down upon said conical inner member and within said outer tubular member, and means yieldingly supporting said cutter blades for radial yielding movement.

3. In a seeder of the character referred to, radially mounted cutter blades yieldingly supported, means for driving said cutter blades together with their cutting edges converging together, an upper larger tubular member slotted through its sides and fitting down over said converging edges, an inner smaller tubular member having sharp tapering upper end and slitted to fit over the converging edges of said cutter blades and adapted to receive therein the seeds and to peel the cut meat of the article therefrom and direct it downwardly through said outer member.

4. In a seeder of the character referred to, radially mounted cutter blades yieldingly supported, means for driving said cutter blades together with their cutting edges converging together, means for lubricating each cutter, means for scraping each cutter to keep it clear, a tubular member having slots therein and fitting down over the converging edges of said cutters to guide matter to said cutters, an inner, upwardly projecting tubular member having a conical open upper end and placed within said first tubular member and below the converging edges of said cutters to receive the seed therein and to peel the meat therefrom as said seed is forced down through said conical inner tubular member.

Signed at Los Angeles, Los Angeles County, California, this 10 day of Sept., 1928.

CLYDE M. WESTCOTT.